United States Patent
Dabas et al.

(10) Patent No.: US 12,171,253 B2
(45) Date of Patent: Dec. 24, 2024

(54) LIGHT STABLE NATURAL YELLOW COLORANT SYSTEMS IN PICKLED AND FERMENTED VEGETABLE APPLICATIONS

(71) Applicant: KALAMAZOO HOLDINGS, INC., Kalamazoo, MI (US)

(72) Inventors: Deepti Dabas, Portage, MI (US); Paulina Costa Zyskowski, Chicago, IL (US); Lindsay Bond, St John's, MI (US); Carol Locey, Manistee, MI (US); Eric Engelman, Dorr, MI (US); Anthony Van Den Hombergh, Kalamazoo, MI (US)

(73) Assignee: KALAMAZOO HOLDINGS, INC., Kalamazoo, MI (US)

( * ) Notice: Subject to any disclaimer, the term of this patent is extended or adjusted under 35 U.S.C. 154(b) by 0 days.

(21) Appl. No.: 18/050,549

(22) Filed: Oct. 28, 2022

(65) Prior Publication Data
US 2023/0084214 A1    Mar. 16, 2023

Related U.S. Application Data

(62) Division of application No. 17/076,058, filed on Oct. 21, 2020, now Pat. No. 11,510,426.
(Continued)

(51) Int. Cl.
*A23L 5/44* (2016.01)
*A23L 3/3463* (2006.01)
*A23L 19/20* (2016.01)

(52) U.S. Cl.
CPC ............... *A23L 5/44* (2016.08); *A23L 3/3463* (2013.01); *A23L 19/20* (2016.08)

(58) Field of Classification Search
CPC ............ A23L 5/44; A23L 19/20; A23L 3/3463
(Continued)

(56) References Cited

U.S. PATENT DOCUMENTS

| 2,982,656 A | 5/1961 | Langenau |
| 5,210,316 A | 5/1993 | Yang |

(Continued)

FOREIGN PATENT DOCUMENTS

| EP | 0700252 | 11/1994 |
| GB | 2132205 | 7/1984 |

(Continued)

OTHER PUBLICATIONS

Translation of KR-101184258-B1 (Year: 2012).*
International Search Report for PCT/US2020/056596 dated Mar. 24, 2021.

*Primary Examiner* — Brent T O'Hern
(74) *Attorney, Agent, or Firm* — HUESCHEN AND SAGE

(57) ABSTRACT

The present invention comprises a novel natural yellow colorant system to enhance the appearance of pickled and/or fermented vegetable products. Individually all-natural yellow pigments failed light stability investigations in pickled and/or fermented vegetable products—either the yellow hue of the brine solution faded, or the pulp/skin of the vegetable turned white, or both. Surprisingly combinations of these same individual natural yellow pigments not only created brine hues and vegetable coloring comparable to FD&C Yellow #5 products but remained stable in accelerated light stability investigations designed to mimic the real-time shelf-life of the products.

4 Claims, 5 Drawing Sheets

Related U.S. Application Data

(60) Provisional application No. 62/923,723, filed on Oct. 21, 2019.

(58) Field of Classification Search
USPC .......................................................... 426/250
See application file for complete search history.

(56) References Cited

U.S. PATENT DOCUMENTS

2011/0258744 A1   10/2011  Todd
2016/0143329 A1    5/2016  Todd

FOREIGN PATENT DOCUMENTS

JP        S55111752        8/1986
KR      101184258 B1 *  9/2012

* cited by examiner

LIGHT STABLE NATURAL YELLOW COLORANT SYSTEMS IN PICKLED AND FERMENTED VEGETABLE APPLICATIONS

FIELD OF THE INVENTION

This present invention relates to a novel composition comprising a combination of natural yellow pigments in pickled and/or fermented vegetable applications that enhance the overall appearance and remain stable over the shelf-life of the products. More particularly, one of the yellow pigments is brine soluble while an additional yellow pigment penetrates into the pickled and/or fermented vegetables. The appearance (hue) at both manufacture and end of shelf-life (expiry) of the combination of natural yellow pigments in pickled and/or fermented vegetable applications is comparable to synthetically derived Tartrazine (a.k.a. FD&C Yellow #5, chemically known as Trisodium 5-hydroxy-1-(4-sulfonatophenyl)-4-[(E)-(4-sulfonatophenyl)diazenyl]-1H-pyrazole-3-carboxylate).

BACKGROUND OF THE INVENTION

Pickling, or preserving vegetables in vinegar, brine or a similar solution, is one of the oldest methods of food preservation. Although the exact origins of the process are unknown, archaeologists believe ancient Mesopotamians began soaking cucumbers in acidic brine to preserve them as far back as 2400 B.C. Several centuries later, cucumbers native to India were being pickled in the Tigris Valley. Since then, they have been a staple in cultures around the globe, renowned for their heartiness, health benefits and delicious taste. Pickles were first brought to America by Christopher Columbus. Like many explorers, Columbus traveled with them because they could survive long journeys and helped prevent scurvy. By the 19th century, H.J. Heinz Company, Inc. had cornered the market, thanks to some truly ingenious marketing strategies. By the beginning of the $21^{st}$ century Americans alone were eating more than 2 million pounds of pickles a year.

Most pickles today are produced by one of three methods: refrigerated, fresh-pack or processed (also called "cured" or "fermented"). Each of these methods creates distinct flavors and textures.

In the refrigerated process vegetables, colorants and other ingredients are added to the brine. In this process the jars are not pasteurized, and thus need to be refrigerated. This may yield a better texture of pickle as the raw cucumbers are not exposed to the heat created by pasteurization. Some fermentation may be expected to occur during shelf-life due to absence of heat processing.

For fresh-pack processing, washed, cleaned and cut cucumbers are placed into a vinegar and salt brine (sugar is also included in relishes and sweet pickles), and allowed to soak. Colorants, preservatives and other ingredients are added at this stage. Jars are then heat pasteurized at 180-185° F. for 30 minutes. Fresh-pack pickles are shelf stable pickles and can be kept at room temperature until opened.

In the fermented process, vegetables are completely immersed in brine and allowed to ferment for 4-6 weeks. Different flavors can be produced by varying temperature range (65-85° F.) and the duration of the fermentation time. After the fermentation process is completed, fresh brine and colorants are added. Jars are then pasteurized to complete processing. Conditions are created in which *Lactobacillus* thrives (absence of oxygen, optimum salt content, no acid addition and pH of 4-6) and produces lactic acid and other metabolites which contribute to taste and long-term quality. During these production processes a variety of flavors are achieved by adding different herbs, spices and seasonings to the pickle brines.

The brines for these three processes can vary greatly, with vinegar concentrations ranging from 0-40%, salt ranges from 2-8%, and sugar concentrations ranging from 0-20%. Each variety is generally packed whole or cut in halves, spears, sticks, chips, chunks, salad cubes or relish, or sliced lengthwise for sandwiches.

To keep pickled and/or fermented vegetable products from fading during their stint on supermarket shelves, manufacturers often add yellow coloring to amplify their natural color. Most modern consumers associate freshness and good taste of the pickle to a yellow hue.

Most commercial brands of pickled and/or fermented vegetable products currently use Tartrazine, an artificial lemon-yellow dye derived from coal tar. Tartrazine also goes by the name FD&C Yellow #5. Tartrazine, is also a popular yellow food dye used in ice cream, soft drinks and fish sticks.

Tartrazine has been linked to asthma, skin rashes, and migraine headaches, as well as having been the focus of studies on mutagenesis and carcinogenesis as a possible food carcinogen. Worldwide, food regulatory agencies have banned or have called for voluntary withdrawal of the coloring by food manufacturers. FD&C Yellow #5 and/or FD&C Yellow #6 are banned or restricted, for example, in Norway, Finland, Sweden and Austria.

Moreover, recent trends have shown that consumers' desire to replace artificial ingredients (flavors, preservatives, dyes, etc.) with natural alternatives (i.e., clean-label). Natural colorants may confer an advantage for use in food products for the fact that the food products may be packaged under a "clean-label" designation, conferring a significant product advantage and being widely accepted by consumers.

Approaches to stabilizing the natural yellow pigment turmeric (*Curcuma longa*), have been attempted without success. Neither the addition of stabilizers nor encapsulating the turmeric with a light-protecting material was successful. Buescher and Yang (1990) describe using aluminum to protect turmeric in pickle brine against decomposition by light, heat and peroxidase. (Buescher R. and Yang L. 1990 *J Food Biochem* 14 (4) 263-271. *Aluminum Stabilizes Turmeric in Pickle Brine Against Decomposition by Light, Heat and Peroxidase*.) Peroxidase destruction of turmeric was uncompetitively inhibited by $Al^{3+}$. Turmeric decomposition increased with increasing temperature from 20 to 90° C. No thermal destruction of turmeric was observed in the presence of 2 or 4 mM $Al^{3+}$. However, aluminum is not a clean-label alternative in food products.

Malacrida et. al. (2014) explored microencapsulation of turmeric oleoresin using modified starch and gelation to create a light stable, water-dispersible powder form without success (Malacrida C. R., Ferreira S. and Zuanon A. AC; Telis V. R. N. 2014. *J Food Processing and Preservation*. 39 (6) 1710-1719. *Freeze-Drying for Microencapsulation of Turmeric Oleoresin Using Modified Starch and Gelatin*).

Kharat et. al. (2017) used different emulsifiers to create emulsified turmeric in an attempt to improve stability (Kharat M, Du Z, Zhang G and McClements D J. 2014. *J Agric Food Chem*. March 1. 65 (8):1525-32. *Physical and Chemical Stability of Curcumin in Aqueous Solutions and Emulsions: Impact of pH, Temperature, and Molecular Environment*).

This type of approach comes with the caveat that the most effective emulsifying ingredients are not natural, and thus not clean-label and/or Kosher. What is more, none of the above reported approaches succeeded in stabilizing turmeric in the final vegetable application, for example, pickles.

Another natural pigment that has been considered to replace FD&C Yellow #5 in pickled and/or fermented vegetable products are carotenes extracted from carrot (*Daucus carota*) or algae or fungal derived carotenes. Synthetic carotenes can also be considered for this purpose. Although the carotenes provide comparable yellow hue to FD&C Yellow #5, and are brine stable, the carotenoids neither absorb nor adsorb into/onto the vegetables. As such, the vegetables appear white in color when removed from the jars for consumption.

Yet another natural ingredient that has been investigated to replace FD&C Yellow #5 in pickled and/or fermented vegetable products is Riboflavin. However, the presence of Riboflavin in pickled and/or fermented vegetables negatively impacts flavor.

Another natural pigment that could be considered to replace FD&C Yellow #5 in pickled and/or fermented vegetable products is Safflower (*Carthamus tinctorius*). However, Safflower is currently not approved by FDA as a color additive in pickled and/or fermented vegetable products.

Therefore, a need still exists in the field for a novel natural yellow colorant system to color pickled and/or fermented vegetable products. Further need exists for the novel natural colorant system to be comparable to FD&C Yellow #5 in hue and performance (stability). The natural pigments also need to be shelf-life stable in low pH and high salt brine solutions. Finally, because most pickled and/or fermented vegetable products are marketed in clear glass jars, there is also a need for the novel natural colorant system to be light stable over the shelf-life of the products.

OBJECT OF THE INVENTION

It is an object of the present invention to provide novel natural (clean-label) yellow colorant systems to enhance the appearance of pickled and/or fermented vegetable products, wherein the color of the vegetable remains stable over the shelf-life of the products.

It is a further object of the invention to provide novel combinations of "clean-label" coloring compositions which may be employed in a process of coloring pickled and/or fermented vegetable products, wherein the color of the vegetable products remains stable over the shelf-life of the products.

SUMMARY OF THE INVENTION

The present invention relates to a natural colorant composition for coloring pickled and/or fermented vegetables comprising of two or more natural colorants.

The natural colorant composition, wherein at least one of the natural colorants is brine soluble and light stable.

The natural colorant composition, wherein at least one of the natural colorants adsorbs or penetrates the pickled and/or fermented vegetable and is light unstable.

The natural colorant composition, wherein at least one of the natural colorants is brine soluble and light stable and wherein at least one of the natural colorants is light unstable and adsorbs or penetrates the pickled and/or fermented vegetable.

The natural colorant composition, wherein the natural colorant which is brine soluble and light stable colorant is an extract derived from carrot, *Daucus carota*.

The natural colorant composition, wherein the colorant which is light unstable and adsorbs or penetrates the pickled and/or fermented vegetable and is an extract derived from turmeric (*Curcuma longa*).

The natural colorant composition, which comprises a combination of extracts of *Curcuma longa* comprising curcuminoids and *Daucus carota* comprising carotenoids.

The natural colorant composition, wherein the curcuminoid content is present in an amount of 1-260 ppm and the carotenoids content is present in an amount of 0.2-50 ppm.

The natural colorant composition, wherein the pickled and/or fermented vegetables are selected from the group consisting of cucumber, cauliflower, onion, carrot, cabbage, watermelon, beet, pepper, and combinations thereof.

The natural colorant composition, wherein the natural colorant which is brine soluble and light stable is zeaxanthin derived from yellow paprika ripe fruit pod flesh or other natural sources and wherein the zeaxanthin content is 0.1-50 ppm.

The natural colorant composition, wherein the natural colorant which is brine soluble and light stable is an extract from Safflower (*Carthamus tinctorius*), and wherein the Safflower extract content is 100-1000 ppm of $E_{1\%}$ 27.6 color strength or equivalent specification.

The natural colorant composition, wherein the natural colorant which is brine soluble and light stable is an extract from yellow beet (*Beta vulgaris*), and wherein the yellow beet extract concentration is 10-100,000 ppm of $E_{1\%}$ 0.375 or equivalent specification.

The natural colorant composition, wherein the natural colorant which is brine soluble and light stable is an extract from gardenia yellow (*Gardenia jasminoides*), wherein the gardenia yellow extract concentration is 1-1000 ppm of $E_{1\%}$ 87 or equivalent specification.

The natural colorant composition, wherein the natural colorant which is brine soluble and light stable is synthetic β-carotene, wherein the carotene content is 0.2-50 ppm.

The natural colorant composition, wherein the natural colorant which is brine soluble and light stable is lutein derived from marigold (*Tagetes erecta*) or yellow paprika ripe fruit pod flesh or other natural sources, wherein the carotenoid content in the composition is 0.2-50 ppm.

The natural colorant composition, wherein the natural colorant which is brine soluble and light stable is algal or fungal sourced β-carotene, wherein the carotenoid content in the composition is 0.2-50 ppm.

The natural colorant composition which comprises a combination of a light unstable natural colorant which is an extract of *Curcuma longa* comprising curcuminoids and a light stable natural colorant selected from the group consisting of carrot extract comprising carotenes, gardenia yellow extract in an amount of 1-1000 ppm of $E_{1\%}$ 87 or equivalent specification, a yellow beet extract in an amount of 10-100,000 ppm of $E_{1\%}$ 0.375 or equivalent specification, a safflower extract in an amount of 100-1000 ppm of $E_{1\%}$ 27.6 color strength or equivalent specification, a yellow paprika ripe fruit pod flesh extract comprising zeaxanthin in an amount of 0.1-50 ppm, a marigold extract comprising lutein in an amount of 0.1-50 ppm, and a fungal or algal derived β-carotene in an amount of 0.2-50 ppm.

The natural colorant composition further comprising clean-label, natural, and industry approved diluents/emulsifiers.

A method for coloring pickled and/or fermented vegetables comprising treating the vegetables with an effective amount the natural colorant composition and further preparing, pickling, processing and/or packaging the vegetables.

The method wherein the pickled and/or fermented vegetables are colored with at least one natural colorant which is brine soluble and light stable and wherein at least one natural colorant which is light unstable adsorbs onto and/or penetrates the pickled and/or fermented vegetable, and wherein the vegetable retains a desired hue over time.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

Figure 1:
FIG. 1 shows the absence of hue stability in fresh-packed pickles when turmeric extract alone is formulated as the natural colorant. The jar on the left of FIG. 1 depicts the pickles at Time Zero, while the jar on the right displays the loss of color after only 2 hours of light exposure (50 W/m$^2$).

The terminology used herein is for the purpose of describing particular embodiments only and is not intended to be limiting of the invention. As used herein, the term "and/or" includes any and all combinations of one or more of the associated listed items. As used herein, the singular forms "a", "an", and "the" are intended to include the plural forms as well as the singular forms, unless the context clearly indicates otherwise. It will be further understood that the terms "comprises" and/or "comprising", when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

Specific embodiments disclosed herein may be further limited in the claims using "consisting of" or "consisting essentially of language". When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s).

As used herein, the term "comprising" or "comprises" is intended to mean that the compositions and methods include the recited elements, but not excluding others.

As used herein, the terms "optional" or "optionally" mean that the subsequently described event or condition may need not occur, and that the description includes instances where the event or condition occurs and instances in which it does not.

The term "effective amount" refers to that quantity of a compound or combination composition that is sufficient to result in a yellow color of pickled or brined vegetable product a refrigerated, fresh-packed, or processed ("cured or "fermented"), which color remains stable over the shelf-life of the products.

"Stability" is the state of being resistant to change. "Hue stability" according to the invention means the stability of pigments and/or color in the vegetable product. It may be measured in terms of maintaining hue angle or other parameters measured by colorimeter or as seen visually.

A desired hue of the vegetable product may be a yellow hue which is essentially comparable to that hue which is observed using Tartrazine (a.k.a. FD&C Yellow #5, chemically known as Trisodium 5-hydroxy-1-(4-sulfonatophenyl)-4-[(E)-(4-sulfonatophenyl)diazenyl]-1H-pyrazole-3-carboxylate) to color the vegetable product.

"Light stability" is the retention of color in a solution and/or vegetable product over time under ultraviolet or phosphorescent lighting conditions. "Light stable" natural colorants/pigments will retain their color to a higher degree compared to a light sensitive/light unstable natural colorant/pigment.

Natural colorants/pigments may be soluble in brine. Light stable natural colorants/pigments retain their hue over time when added to brine. In an embodiment, a natural colorant composition may be a brine comprising a combination of natural extracts, wherein at least one of the colorants/pigments of the extract is light stable and at least one of the colorants/pigments is light unstable, and wherein the colorants/pigments are comprised in the brine in amounts effective to provide a desired hue to a vegetable product.

As used herein, the term "shelf-life" refers to the length of time the pickled and/or fermented vegetable products retain the desired hue. The shelf-life of the pickled and/or fermented vegetable products may be, for example, at least one month, at least 3 months, at least 6 months, at least 9 months, at least one year, under ambient conditions. The ambient conditions for the pickled and/or fermented vegetable products may include being kept under ambient lighting conditions, for example, ambient phosphorescent light.

The pickled or brined vegetable product may be produced by refrigerated, fresh-packed, or processed ("cured or "fermented") methods which are known to those skilled in the art.

The brines for these three processes can vary greatly, with vinegar concentrations ranging from 0-40%, salt ranges from 2-8%, and sugar concentrations ranging from 0-20%. Each vegetable variety may be packed whole or cut in halves, spears, sticks, chips, chunks, salad cubes or relish, or sliced.

In an embodiment, the natural colorant compositions of the invention encompass brine solutions comprising natural colorant/pigment combinations.

In an embodiment, the natural colorant compositions of the invention encompass concentrated solutions or powders comprising natural colorant/pigment combinations for dilution into natural coloring systems for coloring vegetables.

The term "carrot extract" or "carrot" refers to an extract of a member of the genus *Daucus carota*. Carrot extract comprises carotenoids and carotenes which may be used as pigments. The carrot extracts are combined with the vegetable product according to the amount of carotenes present in the extract. In an embodiment, carotenes/carotenoids may be derived from and/or isolated from carrot or algae or fungal sources. In an embodiment, carotenes may be synthetically derived by chemical means.

The term "turmeric extract" or "turmeric" refers to an extract of a member of the genus *Curcuma longa*. Turmeric extract comprises curcuminoids which may be used as pigments. The turmeric extracts are combined with the vegetable product according to the amount of curcuminoids present in the extract.

The term "yellow paprika extract" or "yellow paprika" refers to an extract of the fruit pod flesh of a *Capsicum annuum* paprika plant, which plant exhibits zeaxanthin in the dried ripe fruit pod flesh, wherein the mass of zeaxanthin, when measured in non-esterified form, is greater than 0.4% of the mass of total dried ripe fruit pod flesh and wherein zeaxanthin is the dominant carotenoid, when measured in non-esterified forms. The yellow paprika extracts are combined with the vegetable product according to the amount of zeaxanthin present in the extract.

The term "safflower" refers to an extract of a member of the genus *Carthamus*, for example, *Carthamus tinctorius*.

The term "yellow beet" refers to an extract of the root of a member of the genus *Beta*, for example, *Beta vulgaris*.

The term "Gardenia yellow" refers to an extract of the yellow fruits of a member of the genus *Gardenia*, for example, *Gardenia jasminoides*.

In an embodiment, the natural colorants/pigments may be in the form of an oleoresin, that is an extract prepared from, for example, *Curcuma longa, Daucus carota, Carthamus tinctorius, Tagetes erecta, Gardenia jasminoides, Beta vulgaris* and *Capsicum annuum* yellow/orange paprika, using organic solvents such as acetone, ethanol, and/or hexane.

In an embodiment, the natural colorants/pigments may be in purified form, for example, curcuminoids (which are free from turmeric essential oils), carotenoids, carotenes, lutein, and zeaxanthin.

Emulsifiers as defined in the instant application as "cleanlabel" emulsifiers may be selected from, for example, q-natural, gum arabic, hop acids, and hop fractions.

In describing the invention, it will be understood that a number of techniques and steps are disclosed. Each of these has an individual benefit and each can also be used in conjunction with one or more, or in some cases all, of the other disclosed techniques. Accordingly, for the sake of clarity, the description will refrain from repeating every possible combination of the individual steps in an unnecessary fashion. Nevertheless, the specification and claims should be read with the understanding that such combinations are entirely within the scope and invention of the claims.

New and novel natural yellow pigment compositions for use in pickled and/or fermented vegetable applications which enhance the overall appearance and remain stable over the shelf-life of the products, are discussed herein. In the following description, for the purposes of explanation, numerous specific details are set forth in order to provide a thorough understanding of the present invention. It will be evident, however, to one skilled in the art that the present invention may be practice without these specific details.

The present disclosure is to be considered as an exemplification of the invention and is not intended to limit the invention to the specific embodiments illustrated by the figures or description below.

Individual all-natural yellow pigments of the inventive colorant systems were evaluated for coloring vegetable products, which natural yellow pigments individually failed light stability investigations in pickled and/or fermented vegetable products. With regard to performance of individual natural yellow pigments in treated pickled and/or fermented vegetable products, either the yellow hue of the brine solution faded, or the pulp/skin of the vegetable remained white, or both.

Surprisingly, all-natural yellow pigments when used in combination provided natural colorant systems for use in pickled and/or fermented vegetable products, which natural colorant(s) penetrate into the vegetable product to provide the desired hue and/or provide stability of the hue in the vegetable for product esthetics and consumer acceptability.

Combinations of individual natural yellow pigments not only created hues comparable to FD&C Yellow #5 in both brine and vegetable products, but surprisingly remained stable in both accelerated light stability investigations designed to mimic real-time shelf-life of the products and in real-time shelf-life studies for one year at room temperature in normal light. In preferred embodiments, at least one of the yellow pigments is brine soluble and light stable while an additional yellow pigment, although it may have some brine solubility, and is light unstable, has a higher affinity for and penetrates into the pickled and/or fermented vegetables.

The present invention will now be described by representing preferred embodiments, displaying data from stability investigations and referencing the appended figures.

Example 1. Carrot Extract in Fresh-Packed Pickles

The colorant effect of carrot extract on vegetables was studied by pickling cucumbers in brine comprising carrot extract at various concentrations in the brine. The cucumbers were fresh-packed according to methods known in the art.

Investigations using carrot extract in fresh-packed pickles revealed the carrot extract produced a yellow hue brine comparable yellow hue to FD&C Yellow #5 pickles at time zero and was light stable. However, the stability investigation revealed carrot extracts having 1.5 ppm carotenes (sample 1 of Table 1) or 3 ppm carotenes (sample 2 of Table 1) did not adsorb onto or penetrate the cucumbers, and as such, the pickles appeared white in color. This is confirmed by the lower b* values and lower hue angles taken of the spears when removed from the brine. See the results in Table 1.

TABLE 1

Colorimetry of pickle flesh for example 1 investigation.

| Sample | L* | a* | b* | Hue Angle | Chroma |
|---|---|---|---|---|---|
| 1 | 60.2 | −3.0 | 5.2 | −57.5 | 6.0 |
| 2 | 60.2 | −3.0 | 5.2 | −57.5 | 6.0 |
| 3 | 53.4 | −7.2 | 32.6 | −77.3 | 29.1 |
| 4 | 55.6 | −7.1 | 33.1 | −77.9 | 33.9 |

L* refers to lightness with higher number indicating whiter sample. The a* represents the red-green component, with red in positive direction and green in negative. The b* represents yellow-blue component with yellow in positive direction and blue in negative. Hue angle refers to the hue perceived and is calculated from a* and b* values. Chroma is defined as strength or saturation of color. The formulas are:
$$\text{Hue angle} = \tan^{-1}\left(\frac{b*}{a*}\right) \quad \text{Chroma} = \sqrt{(a^2 + b^2)}$$

A handheld colorimeter (CM700 D) in reflectance mode was used (D 65 source, 10° observer) for this and subsequent studies.

Example 2. Turmeric Extract in Fresh-Packed Pickles at Different Concentrations

The colorant effect of turmeric extract on vegetables was studied by pickling cucumbers in brine comprising turmeric extract at various concentrations in the brine. The cucumbers were fresh-packed according to methods known in the art.

Investigation employing turmeric extract in fresh-packed pickle stability investigations revealed turmeric extract produced comparable yellow hue to FD&C Yellow #5 pickles initially, however, it was neither brine and light-stable nor light-stable in the cucumbers after just 2 hours (See FIG. 1).

Figure 3:
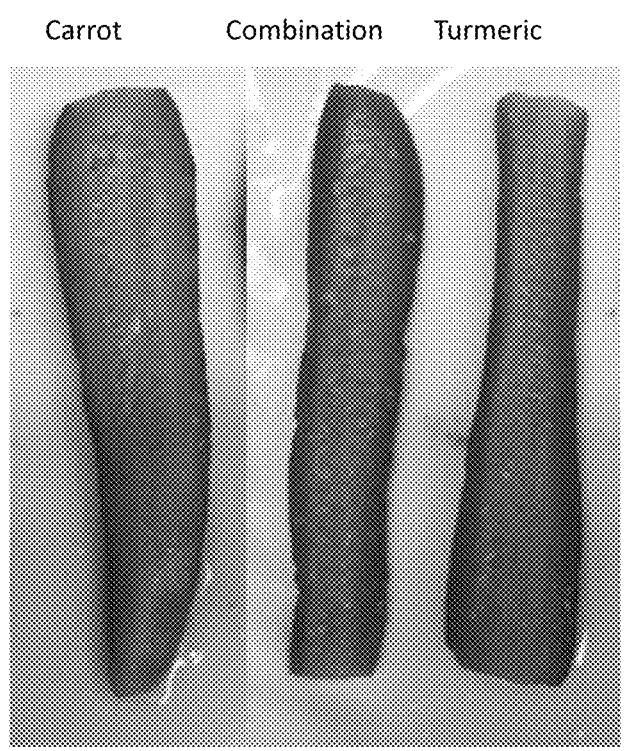
FIG. 3 shows the absence of color in cucumber pickle colored with carrot extract (1.5 ppm carotenoids). Placed alongside are pickles colored with combination of turmeric (13 ppm curcuminoids) and carrot extract (1.5 ppm carotenoids) and turmeric only (13 ppm curcuminoids), which are both colored.

FIG. 3 is a representation of the color of the fresh-packed pickles treated with natural colorants, either carrot extract alone, a combination of carrot extract and turmeric extract, or turmeric extract alone. Colorimetry of the pickle flesh treated with natural colorant compositions is shown in Table 1. When turmeric extract alone having 13 ppm curcuminoids (sample 3) was used, the pickles were colored as seen from the higher b* values and the higher hue angles. Pickles with turmeric also had a much higher chroma values compared to carrot extract alone (samples 1 and 2). When a combination of turmeric extract and carrot extract was used having about 13 ppm curcuminoids/1.5 ppm carotenes (sample 4) the pickles were colored.

Table 2 displays colorimetric readings (CM700 D hand held colorimeter) of the Turmeric extract colored pickles at time zero and after 2 hours of light exposure at 50 W/m². Of note is the extreme change in b* value after only 2 hours of light exposure.

TABLE 2

L*a*b* results for Example 2 stability investigation.

| Sample | L* | a* | b* | Chroma |
|---|---|---|---|---|
| Time zero | 17.34 | −0.08 | 17.3 | 17.3 |
| 2 hours | 12.97 | −0.03 | 8.37 | 8.37 |

It may be concluded that neither carrot extract nor turmeric extract alone could sufficiently replace FD&C Yellow #5 in fresh-packed pickle applications. Carrot extract was unsuccessful due to the lack of absorption or penetration into the pickles, while turmeric extract was not light stable in either brine or cucumber.

Figure 2:
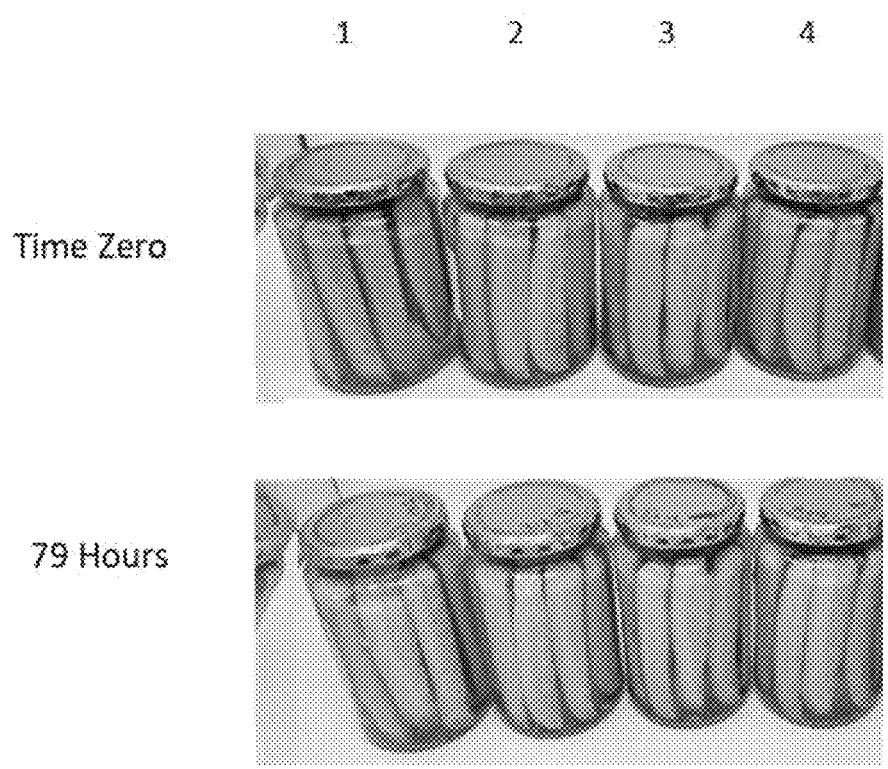
FIG. 2 shows the absence hue stability in fresh-packed pickles (after 79 hours of light exposure at 50 W/m$^2$) when turmeric extract alone is formulated as the natural colorant. Sample 1: 14 ppm curcuminoids/gum arabic, sample 2: 18.8 ppm curcuminoids/gum arabic, sample 3: 28.1 ppm curcuminoids/gum Arabic, and sample 4: 15 ppm curcuminoids/polysorbate 80.

Example 3. Turmeric Extract in Fresh-Packed Pickles at Higher Concentrations and Alternate Emulsifiers Various doses of turmeric extract curcuminoids (sample 1: 14 ppm, sample 2: 18.8 ppm, sample 3: 28.1 ppm and sample 4: 15 ppm) were investigated to determine if higher concentrations of turmeric extract would lead to improved shelf-life appearance of both brine and cucumber. These investigations employing multiple doses of turmeric extract in fresh-packed pickles revealed increased turmeric extract levels produced comparable yellow hue to FD&C Yellow #5 pickles initially, however, it was neither brine and light stable, nor light stable in the cucumbers (see FIG. 2). Variation in emulsifiers also did not improve light stability; samples 1-3 contained gum arabic, whereas sample 4 contained polysorbate 80. Table 3 displays colorimetric readings (CM700 D handheld colorimeter) of the Turmeric extract colored pickles at time zero and after 79 hours of light exposure at 50 W/m².

TABLE 3

L*a*b* results for Example 3 stability investigation.

| | Time Zero | | | | 79 Hours Light Exposure | | | |
|---|---|---|---|---|---|---|---|---|
| Sample | L* | a* | b* | Chroma | L* | a* | b* | Chroma |
| 1 | 17.34 | −0.08 | 17.3 | 17.3 | 14.08 | 0.48 | 4.79 | 4.81 |
| 2 | 21.58 | −0.17 | 7.85 | 7.86 | 16.46 | 0.54 | 6.76 | 6.79 |
| 3 | 21.91 | −0.06 | 8.50 | 8.50 | 17.73 | 0.44 | 6.04 | 6.95 |
| 4 | 19.20 | −0.42 | 9.49 | 9.49 | 15.51 | 0.45 | 4.11 | 4.14 |

Figure 4:
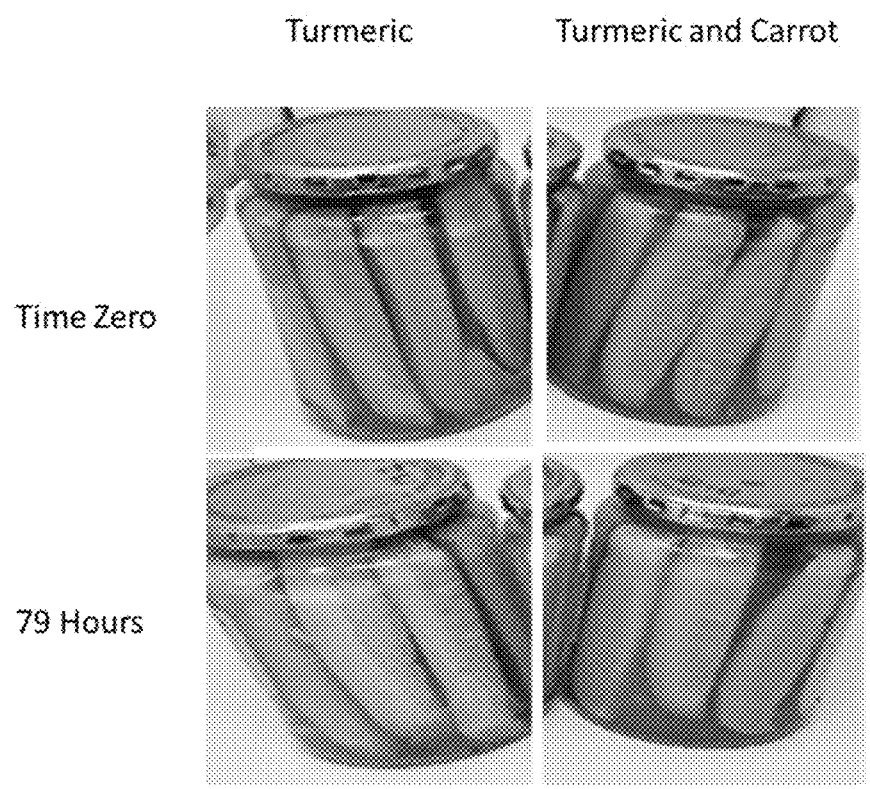
FIG. 4 shows hue stability in fresh-packed pickles (after 79 hours of light exposure at 50 W/m$^2$) when turmeric extract and carrot extract are formulated as the natural colorant system. The concentration of curcuminoids in the turmeric extract sample was 14 ppm; the turmeric extract and carrot extract combination sample contained 14 ppm curcuminoids and 1.5 ppm carotenes.

Example 4. Natural Colorant System Comprising Both Turmeric Extract and Carrot Extract in a Pickle System Investigations combining turmeric extract and carrot extract in fresh-packed pickle stability studies produced comparable yellow hue to FD&C Yellow #5 pickles initially. Surprisingly, the yellow hue also remained brine and vegetable stable even after 79 hours of 50 W/m² light exposure (FIG. 4). Table 4 displays the colorimetric readings of the turmeric extract and carrot extract colored pickles at Time Zero and after 79 hours of light exposure. Of note is the extremely stable b value after 79 hours of light exposure.

TABLE 4

L*a*b* results for Example 4 stability investigation.

| Sample | L* | a* | b* | Chroma |
|---|---|---|---|---|
| Time Zero | 19.78 | 0.63 | 7.04 | 7.08 |
| 79 Hours | 17.58 | 0.96 | 7.83 | 7.89 |

Figure 5:
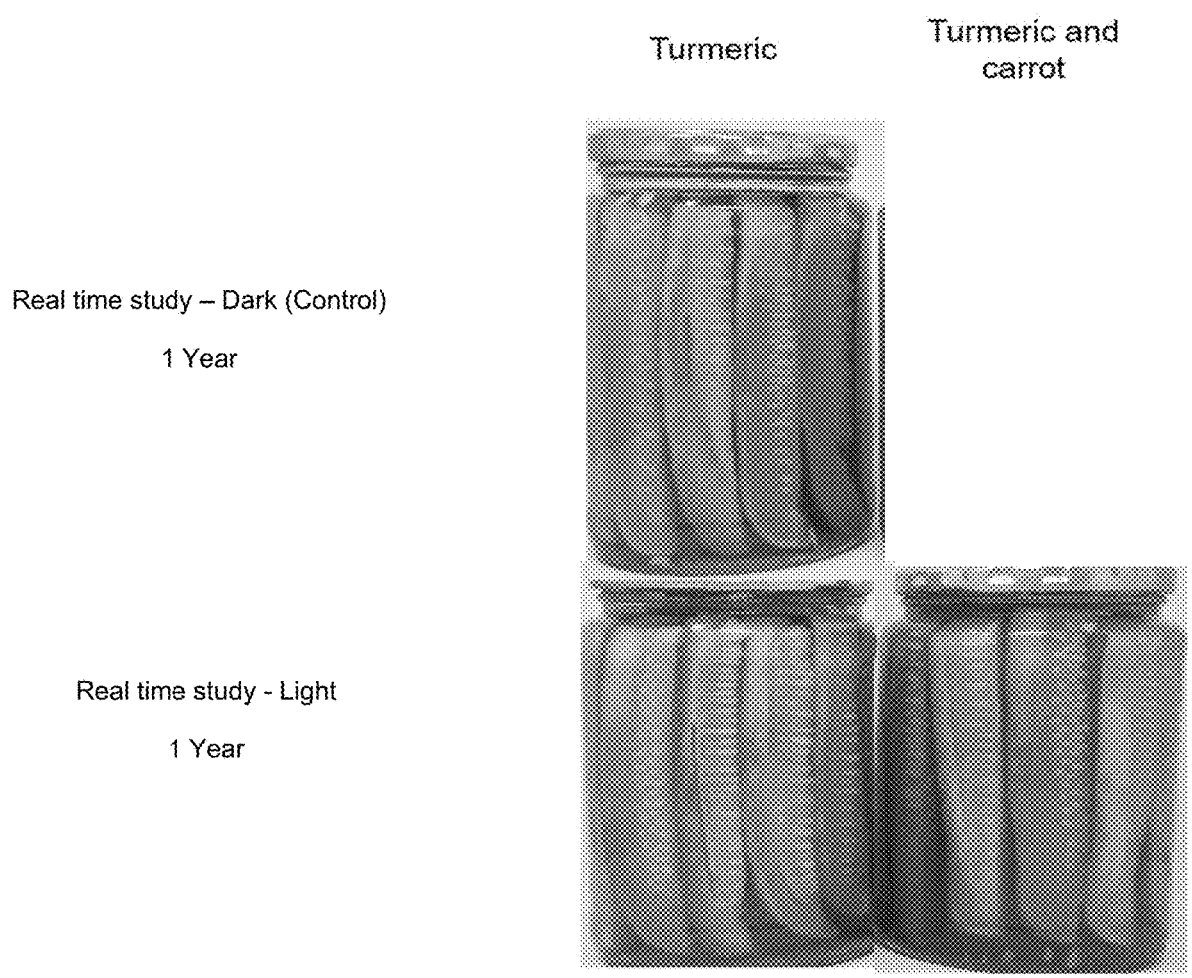
FIG. 5 shows hue stability of fresh-packed pickles after 1 year of ambient storage at 200-300 lux compared to control, i.e. samples in dark. The concentration of curcuminoids in the turmeric extract sample was 14 ppm; the turmeric and carrot extract combination sample contained 14 ppm curcuminoids and 1.5 ppm carotenes.

When this study was continued in real time under ambient phosphorescent light at 200-300 lux, colorimetry was carried out at different time intervals and is shown in Table 5. As can be observed the combination is retaining its b* value much better than control (turmeric). When this study was continued for 1 year the samples were visually compared to samples in dark, and the combination of turmeric and carrot extracts still retained color whereas turmeric extract alone had lost most of its color, see FIG. 5.

TABLE 5 b* values and % retention on 126 days

| Sample | Turmeric | Turmeric and Carrot |
|---|---|---|
| Day 0 | 14.78 | 12.43 |
| Day 126 | 5.57 | 8.84 |
| 126 day b* value retention (%) | 37.68 | 71.17 |

Example 5. Real-Life Stability of Pickles Colored with Turmeric Extract and Carrot Extract at Increasing Concentrations Further to the previous study in Example 4, another study in pickles was done with increasing turmeric and carrot extract concentrations in the brine. Pickles were processed and kept in ambient light (300 lux) for increasing time intervals. The doses of turmeric extract and carrot extract which were used are listed in Table 6.

TABLE 6

Concentrations of different combinations of turmeric extract and carrot extract used to make pickles.

| Sample | Description |
|---|---|
| 1 | Turmeric (14 ppm curcuminoids) |
| 2 | Turmeric (14 ppm curcuminoids) + Carrot (1.5 ppm carotenes) |
| 3 | Turmeric (16 ppm curcuminoids) + Carrot (1.725 ppm carotenes) |
| 4 | Turmeric (18.4 ppm curcuminoids) + Carrot (1.95 ppm carotenes) |

Colorimetric parameters were measured from outside the jars and the b* and chroma values were noted. All the treatments: 2, 3 and 4; combinations of turmeric and carrot extracts maintained their b* values and chroma much better than 1, hence the combinations outperformed 1, i.e. turmeric extract only.

TABLE 7

Colorimetric parameters of pickle jars kept in ambient light for 35 weeks

| Time point | 1 | | 2 | | 3 | | 4 | |
|---|---|---|---|---|---|---|---|---|
| (weeks) | b* | Chroma | b* | Chroma | b* | Chroma | b* | Chroma |
| 0 | 16.72 | 17.41 | 20.46 | 21.1 | 22.17 | 22.83 | 28.97 | 24.98 |
| 4 | 15.06 | 15.53 | 27.17 | 27.46 | 24.22 | 24.55 | 29.43 | 29.62 |
| 13 | 12.66 | 13.01 | 22.72 | 22.96 | 22.08 | 22.33 | 23.45 | 23.72 |
| 21 | 17.05 | 17.07 | 31.48 | 31.53 | 21.09 | 21.09 | 33.81 | 33.99 |
| 35 | 11.24 | 11.28 | 27.72 | 27.83 | 23.15 | 23.21 | 29.11 | 29.16 |

Example 6. Performance of Turmeric Extract and Carrot Extract in a Pickle System with Brine Measured Spectrophotometrically Pickles were fresh-pack prepared using turmeric and carrot extracts. Colors was added to the brine as mentioned below in Table 8.

TABLE 8

Concentrations of different colors including combination used to create pickles.

| Sample | | Concentrations |
|---|---|---|
| 1 | Combination | 13 ppm curcuminoids + 1.5 ppm carotenes |
| 2 | Turmeric | 13 ppm curcuminoids |
| 3 | Carrot | 1.5 ppm carotenes |
| 4 | Carrot high | 2.91 ppm carotenes |
| 5 | Brine | |

Jars were kept in 50 W/m$^2$ light to observe the effect of light degradation on the brine and cucumbers. A different way of measuring the brine intensities was used in this example—we followed intensities at 420 nm (absorbance maxima for turmeric extract) and 450 nm (absorbance maxima for carrot extract) using a spectrophotometer to measure the intensities. Appropriate amount of brine was taken and acetone added to dissolve the pigment and the color intensities were calculated. As the samples were kept in light, the intensities at 420 and 450 nm both reduced as seen in table below which indicates that brine is losing color as time goes on. Carrot extracts alone had the best color retention in brine and are shown to be more light stable than turmeric extracts alone. The brine lost its color quickly when turmeric extract alone was added indicating that turmeric is light unstable in the brine. The results are shown in Tables 9 and 10.

TABLE 9

% Color retention at 420 nm (absorbance maxima of turmeric extract)

| Time (h) | Combination | Turmeric | Carrot | Carrot high |
|---|---|---|---|---|
| 0 | 100.0 | 100.0 | 100.0 | 100.0 |
| 1 | 49.4 | 30.6 | 80.8 | 77.2 |
| 2 | 26.8 | 20.7 | 70.6 | 58.0 |
| 3 | 16.8 | 16.3 | 55.1 | 45.2 |

TABLE 10

% Color retention at 450 nm (absorbance maxima of carrot extract).

| Time (h) | Combination | Turmeric | Carrot | Carrot high |
|---|---|---|---|---|
| 0 | 100.0 | 100.0 | 100.0 | 100.0 |
| 1 | 46.6 | 20.8 | 80.0 | 79.3 |
| 2 | 19.5 | 14.3 | 60.9 | 56.7 |
| 3 | 9.8 | 11.1 | 37.8 | 39.8 |

The colorimetry of pickle slices was done in order to measure the color loss. The color differences kept on increasing as the time in light increased with turmeric having the largest values indicating higher color loss, followed by that of combination of turmeric and carrot extracts. This shows improvement of pickle color stability over turmeric extract alone when both turmeric extract and carrot extract are present. For the carrot extract alone, the color differences are not significant since the carrot extract colorant did not absorb into the pickle to start with (see Table 11).

TABLE 11

Color differences of the slice (open side).

| Time (h) | Combination | Turmeric | Carrot | Carrot high | Brine |
|---|---|---|---|---|---|
| 0 | 7.54 | 10.74 | 3.06 | 1.388 | 6.6 |
| 1 | 16.15 | 19.49 | 4.34 | 4.79 | 7.1 |
| 2 | 17 | 17.87 | 15.09 | 11.67 | 6.4 |
| 3 | 19.37 | 27.88 | 5.54 | 7.8 | 6.9 |

A D65 source and 10° observer were used to calculate ΔE, Color Differences. Equation below, where $L_o$, $a_o$ and $b_o$ are zero time colorimetric parameters and L, a and b are for the time point for which ΔE is calculated as:

$$\Delta E = \sqrt{(L-L_o)^2 + (a-a_o)^2 + (b-b_o)^2}$$

When chromas of the slices were compared, turmeric extract lost most of its chroma as time went on. Combination of carrot and turmeric extracts had the highest chroma. For carrot extract, the values did not change much since carrot extract colorant did not absorb into the pickle to start with. See Table 12.

TABLE 12

Chroma of cucumber slices (open side)

| Time (h) | Combination | Turmeric | Carrot | Carrot high | Brine |
|---|---|---|---|---|---|
| 0 | 33.89 | 30.09 | 6.76 | 6.81 | 6.31 |
| 1 | 21.74 | 14.26 | 4.29 | 5.08 | 1.91 |
| 2 | 21.38 | 17.67 | 3.87 | 4.037 | 2.808 |
| 3 | 18.44 | 7.117 | 3.95 | 3.569 | 2.537 |

With regard to the natural colorant system, the example demonstrates that turmeric extract pigments performed better than the carrot extract in coloring the pickle, but the color fades very quickly making the pickle look unsavory (and colorless). Even though carrot extract was shown to be light stable and performs as a colorant in the brine, the carrot extract does not color the pickle. The combination comprising carrot extract and the turmeric extract provided the desired color of the vegetable and color stability of the pickle over time.

The natural colorant system comprising a combination of a light stable colorant and a light unstable colorant surprisingly provides a vegetable having the desired yellow hue and light stability for a shelf stable vegetable product.

Example 7. Natural Brine Color System Comprising Both Turmeric Extract and Carrot Extract Pickle brine was prepared and colorants/pigments were added to brine samples in the amounts listed in Table 13.

TABLE 13

Samples and concentrations added to brine

| Sample | Constituents and amounts |
|---|---|
| Combination | 13 ppm curcuminoids and 1.5 ppm carotenes |
| Turmeric low | 13 ppm curcuminoids |
| Turmeric high | 15.3 ppm curcuminoids |
| Carrot | 1.5 ppm carotenes |

Intensities at both absorbance maxima (420 nm for turmeric extract and 450 nm for carrot extract) were monitored as the brine samples were subjected to 9 klux light intensities for a total of 3 h. See the results shown in Tables 14 and 15.

TABLE 14

% Intensity retention at 420 nm in brine on storage in light (9 Klux)

| Time (h) | Combination | Turmeric low | Turmeric high | Carrot |
|---|---|---|---|---|
| 0 | 100.0 | 100.0 | 100.0 | 100.0 |
| 1 | 64.1 | 50.7 | 53.5 | 119.2 |
| 2 | 50.2 | 26.9 | 27.3 | 107.1 |
| 3 | 36.4 | 20.5 | 19.6 | 68.4 |

TABLE 15

% Intensity retention at 450 nm in brine on storage in light (9 Klux)

| Time (h) | Combination | Turmeric low | Turmeric high | Carrot |
|---|---|---|---|---|
| 0 | 100.0 | 100.0 | 100.0 | 100.0 |
| 1 | 64.5 | 44.1 | 47.0 | 111.7 |
| 2 | 50.9 | 20.1 | 19.6 | 106.2 |
| 3 | 35.6 | 12.3 | 12.2 | 57.6 |

As the samples were kept in light, the intensities at 420 and 450 nm both reduced as seen in Tables 14 and 15, which indicates that brine is losing color as time goes on. Carrot extracts alone had the best color retention in brine and are shown to be more light stable than turmeric extracts alone. The brine lost its color quickly when turmeric extract alone was added indicating that turmeric is light unstable.

Example 8. Other Yellow Colors in Pickles

The following yellow colorants were added to brines and used to make pickles in order to determine if the color will be adsorbed onto or penetrated into the cucumbers. The samples and concentrations of colorants used are listed in Table 16.

TABLE 16

Concentrations of yellow colors used to color brine for making pickles

| Sample name | Color and amounts |
| --- | --- |
| Yellow Paprika | 1.25 ppm zeaxanthin |
| Safflower | 274 ppm of $E_{1\%}$ 27.6 |
| Gardenia yellow | 88 ppm of $E_{1\%}$ 87 |
| Yellow Beet | 2% of $E_{1\%}$ 0.375 |
| Turmeric | 14 ppm curcuminoids |

Pickles were made according to methods known in the art and jars were opened to assess the color of slices and b* values, chroma and hue angles. The results are shown below in Table 17.

TABLE 17

Colorimetric parameters of cucumber slices of processed pickles colored with individual yellow colorants

| Sample | b* | Chroma | Hue angle |
| --- | --- | --- | --- |
| Yellow Paprika | 11.93 | 12.26 | −76.61 |
| Safflower | 13.1 | 13.78 | −71.77 |
| Gardenia yellow | 17.1 | 17.66 | −75.74 |
| Yellow Beet | 14.32 | 53.17 | −3.94 |
| Turmeric | 32.61 | 29.12 | −77.32 |

When these colorants were used as sole pigments to color the pickles, all the pigments displayed lower b* values than turmeric and also lower chroma values. Gardenia yellow had a higher b* value of 17.1 but still significantly lower than turmeric. Hence these colors can be used in combinations with turmeric where they will preferentially or only color brine and turmeric will be absorbed into the pickles to provide a shelf-stable product.

Had these colors absorbed/adsorbed onto by the cucumber, these might be considered as a stand-alone colorant for pickle, given their high stability under light in the pickle system. In that case, they would be candidates to replace turmeric.

Example 9. Natural Brine Color System Comprising Both Turmeric and Zeaxanthin After preparing the brine, colorants were added the brine samples in the amounts listed in Table 18.

TABLE 18

Samples and concentrations added to brine

| Sample | Constituents and amounts |
| --- | --- |
| Combination | 13 ppm curcuminoids and 1.25 ppm zeaxanthin |
| Turmeric | 13 ppm curcuminoids |
| Yellow paprika | 1.25 ppm zeaxanthin |

Intensities at both absorbance maxima (420 nm for turmeric and 454 nm for yellow paprika respectively) were monitored as the brine samples were stored under 9 klux light intensities for a total of 3 h. The combination retained more intensities at both 420 and 454 nm compared to turmeric extract alone samples. The turmeric extract alone sample lost the most color intensity indicating that the turmeric extract comprising curcuminoids is light unstable. Yellow paprika plant extract comprising zeaxanthin alone retained the most intensity indicating that the yellow paprika plant extract zeaxanthin is brine soluble and light stable. See Tables 19 and 20.

TABLE 19

% Intensity retention at 420 nm in brine on storage in light (9 Klux)

| Time (h) | Combination | Turmeric | Yellow Paprika |
| --- | --- | --- | --- |
| 0 | 100.0 | 100.0 | 100.0 |
| 1 | 72.9 | 60.7 | 117.3 |
| 2 | 60.7 | 39.1 | 114.8 |
| 3 | 44.1 | 20.9 | 122.7 |

TABLE 20

% Intensity retention at 454 nm in brine on storage in light (9 Klux)

| Time (h) | Combination | Turmeric | Yellow Paprika |
| --- | --- | --- | --- |
| 0 | 100.0 | 100.0 | 100.0 |
| 1 | 73.8 | 55.5 | 110.0 |
| 2 | 61.7 | 31.1 | 108.2 |
| 3 | 46.0 | 12.8 | 113.1 |

Example 10. Natural Brine Color System Comprising Both Turmeric Extract and Safflower Extract After preparing the brine, colorants were added to brine samples in the amounts listed in Table 21.

TABLE 21

Samples and concentrations added to brine

| Sample | Constituents and Amounts |
| --- | --- |
| Combination | 13 ppm curcuminoids and 137 ppm safflower of $E_{1\%}$ 27.5 |
| Turmeric | 13 ppm curcuminoids |
| Safflower | 137.5 ppm of $E_{1\%}$ 27.5 |

Intensities at both absorbance maxima (420 nm for turmeric and 405 nm for safflower respectively) were monitored as the brine samples were stored under 9 klux light intensities for a total of 3 h. The combination retained more intensities at both 420 and 405 nm compared to turmeric samples. Safflower extract alone retained the most intensity indicating that the safflower extract is brine soluble and light stable. (Table 22 and 23).

TABLE 22

% Intensity retention at 420 nm in brine on storage in light (9 Klux)

| Time (h) | Combination | Turmeric | Safflower |
| --- | --- | --- | --- |
| 0 | 100.00 | 100.00 | 100.00 |
| 1 | 82.19 | 59.01 | 95.36 |
| 2 | 57.54 | 30.15 | 95.35 |
| 3 | 45.26 | 16.71 | 95.30 |

TABLE 23

% Intensity retention at 405 nm in brine on storage in light (9 Klux)

| Time (h) | Combination | Turmeric | Safflower |
|---|---|---|---|
| 0 | 100.00 | 100.00 | 100.00 |
| 1 | 75.70 | 67.85 | 96.76 |
| 2 | 63.77 | 42.76 | 96.70 |
| 3 | 53.73 | 28.55 | 96.83 |

Example 11. Natural Brine Color System Comprising Both Turmeric Extract and Gardenia Yellow Extract After preparing the brine, colorants were added to brine samples in the amounts listed in Table 24:

TABLE 24

Samples and concentrations added to brine

| Sample | Constituents and amounts |
|---|---|
| Combination | 13 ppm curcuminoids and 44 ppm gardenia yellow ($E_{1\%}$ 87) |
| Turmeric | 13 ppm curcuminoids |
| Gardenia Yellow | 44 ppm of $E_{1\%}$ 87 |

Intensities at both absorbance maxima (420 nm for turmeric and 442 nm for gardenia yellow) were monitored as the brine samples were stored under 9 klux light intensities for a total of 3 h. The combination retained more intensities at both 420 and 442 nm compared to turmeric extract alone samples. Gardenia yellow alone retained the most intensity indicating that the Gardenia yellow is brine soluble and light stable. See Tables 25 and 26.

TABLE 25

% Intensity retention at 420 nm in brine on storage in light (9 Klux)

| Time | Combination | Turmeric | Gardenia yellow |
|---|---|---|---|
| 0 | 100.00 | 100.00 | 100.00 |
| 1 | 61.92 | 50.64 | 100.37 |
| 2 | 39.72 | 24.18 | 93.52 |
| 3 | 30.68 | 13.37 | 96.45 |

TABLE 26

% Intensity retention at 442 nm in brine on storage in light (9 Klux)

| Time | Combination | Turmeric | Gardenia yellow |
|---|---|---|---|
| 0 | 100.00 | 100.00 | 100.00 |
| 1 | 58.51 | 45.13 | 97.57 |
| 2 | 34.83 | 16.79 | 91.53 |
| 3 | 25.45 | 7.20 | 94.23 |

Example 12. Simulated Pickle System Using Brine

This experiment was considered a simulated exercise in order to test whether solution surrounding a scintillation (scint) vial in which turmeric extract color is placed, will protect the solution within the scint vial. It was seen in the pickle example described above, that the cucumber color was protected when carrot extract was additionally incorporated in the brine along with the turmeric extract. After filling the scint vial with solution containing turmeric extract, the vial was kept in a 4 oz glass jar. The glass jar contained the 'protecting' solutions, namely carrot extract or gardenia yellow or safflower or yellow beet or yellow paprika (zeaxanthin) extracts. These solutions were kept in 50 W/m² light box for increasing time and the intensities at both turmeric's and the respective color's absorbance maxima measured. Acetone was used as a solvent to dissolve the pigment and to accurately measure the color with same ratio of colored brine to acetone being used at all time points. The amounts of yellow pigments used in the experiment are listed in Table 26.

TABLE 26

Concentrations of yellow pigments used in the jar with turmeric extract (13 ppm curcuminoids) in the scint vial. Scint vials filled with turmeric extracts were placed inside the jars and placed under lighted conditions.

| Pigment | Amount | Potency of product where needed |
|---|---|---|
| Carrot | 1.5 ppm carotenes | |
| Safflower | 140 ppm | $E_{1\%}$ 27.5 |
| Gardenia yellow | 10.8 ppm | $E_{1\%}$ 400 |
| Yellow Beet | 10004 ppm | $E_{1\%}$ 0.375 |
| Yellow paprika | 1.3 ppm zeaxanthin | |

Table 27 below shows the turmeric intensity retention at 420 nm, when the scint vials containing turmeric extract were placed in glass jars containing different yellow solutions. The jars were incubated at 50 W/m² for up to 90 min. These outside solutions effectively protected turmeric colorant more than brine only control—a scenario where only turmeric is used in the pickle system and quickly loses color. This indicates that these light stable colorants when added to turmeric extract colorant will effectively protect the turmeric colorant and hence maintain the color over time.

TABLE 27

Retention of turmeric intensity at 420 nm, within the scint vial when different yellow solutions are added to the glass jar

| Time (min) | Brine | Carrot | Safflower | Gardenia Yellow | Yellow Beet | Yellow Paprika |
|---|---|---|---|---|---|---|
| 0 | 100.00 | 100.00 | 100.00 | 100.00 | 100.00 | 100.00 |
| 30 | 67.63 | 82.70 | 81.67 | 82.62 | 78.42 | 79.18 |
| 60 | 42.50 | 75.60 | 61.85 | 74.25 | 59.85 | 70.76 |
| 90 | 26.88 | 43.37 | 42.03 | 59.18 | 48.34 | 57.02 |

Retention of intensity of turmeric is maintained better when the outside solutions is one of the following yellows compared to when just brine (control) is present in surrounding media, i.e. in the glass jar. This indicates that turmeric extract colorant/pigment is protected from degradation and/or stabilized by the additional presence of any of these yellow light stable colors.

TABLE 28

Retention of different yellow solutions (at their respective absorbance maxima) kept in glass jar, that are protecting the turmeric solution kept in the scint vial

| Time (min) | Carrot | Safflower | Gardenia Yellow | Yellow Beet | Yellow Paprika |
|---|---|---|---|---|---|
| 0 | 100 | 100 | 100 | 100 | 100 |
| 30 | 95.0 | 104.2 | 90.9 | 87.7 | 92.6 |

TABLE 28-continued

Retention of different yellow solutions (at their respective absorbance maxima) kept in glass jar, that are protecting the turmeric solution kept in the scint vial

| Time (min) | Carrot | Safflower | Gardenia Yellow | Yellow Beet | Yellow Paprika |
|---|---|---|---|---|---|
| 60 | 99.2 | 101.4 | 93.0 | 97.3 | 100.9 |
| 90 | 94.9 | 103.0 | 91.1 | 97.6 | 100.0 |

Table 28 above shows the color retention of the outside solutions that protected turmeric extract kept in scint vials. The % intensities were measured at respective absorbance maxima and were seen to be well maintained for 90 min at 50 W/m². This indicates that these colorants individually are much more light stable than turmeric and even while protecting the turmeric color from degradation (fading), individually do not undergo much degradation, hence they can be useful turmeric protective agents.

The present invention is not to be limited in scope by the specific embodiments described herein. Indeed, various modifications of the invention in addition to those described herein will become apparent to those skilled in the art from the foregoing description. Such modifications are intended to fall within the scope of the appended claims.

All patents, applications, publications, test methods, literature, and other materials cited herein are hereby incorporated by reference.

The invention claimed is:

1. A process for producing a pickled and/or fermented vegetable product comprising treating vegetables having at least one of pulp and skin which is white in color to a solution comprising an extract of turmeric (*Curcuma longa*) wherein curcuminoids are present in the solution in an amount of 1-260 ppm, and at least one other extract selected from the group consisting of carrot (*Daucus carota*) extract comprising carotenes present in the solution in an amount of 0.2-50 ppm, gardenia yellow (*Gardenia jasminoides*) extract in the solution in an amount of 1-1000 ppm of $E_{1\%}$ 87, a yellow beet (*Beta vulgaris*) extract in the solution in an amount of 10-100,000 ppm of $E_{1\%}$ 0.375, a safflower extract in the solution in an amount of 100-1000 ppm of $E_{1\%}$ 27.6 color strength, a yellow paprika (*Capsicum annuum*) ripe fruit pod flesh extract comprising zeaxanthin in the solution in an amount of 0.1-50 ppm, a marigold (*Tagetes erecta*) extract comprising lutein in the solution in an amount of 0.1-50 ppm, a fungal or algal derived β-carotene in the solution in an amount of 0.2-50 ppm, and synthetic β-carotene in the solution in an amount of 0.2 ppm-50 ppm, and preparing, pickling, processing and/or packaging the vegetables, wherein the curcuminoids are adsorbed to and/or penetrated into the vegetables to provide a yellow hue, and wherein the vegetables retain the yellow hue over a shelf-life of the product.

2. The process of claim 1, wherein the solution comprises a combination of an extract of the turmeric (*Curcuma longa*) comprising the curcuminoids present in an amount of 1-260 ppm and the extract of carrot (*Daucus carota*) comprising carotenes present in an amount of 0.2-50 ppm.

3. The process of claim 1, wherein the vegetables are selected from the group consisting of cucumber, cauliflower, white onion, white carrot, cabbage, white beet, and combinations thereof.

4. The process of claim 1, wherein the shelf-life of the product is at least one month.

\* \* \* \* \*